United States Patent
Nguyen et al.

(10) Patent No.: US 8,282,048 B2
(45) Date of Patent: Oct. 9, 2012

(54) SIDE-LOCKING CLAMPING APPARATUS AND METHOD

(75) Inventors: Ky Nguyen, Torrance, CA (US); Bob Sumners, Corona, CA (US)

(73) Assignee: AdelWiggins Group, Los Angeles, CA (US)

( * ) Notice: Subject to any disclaimer, the term of this patent is extended or adjusted under 35 U.S.C. 154(b) by 174 days.

(21) Appl. No.: 12/775,623

(22) Filed: May 7, 2010

(65) Prior Publication Data

US 2010/0281658 A1 Nov. 11, 2010

Related U.S. Application Data

(60) Provisional application No. 61/176,236, filed on May 7, 2009.

(51) Int. Cl.
*F16L 3/08* (2006.01)

(52) U.S. Cl. .................. 248/74.3; 248/74.1; 24/16 R (58) Field of Classification Search ............... 248/74.1, 248/49, 65, 67.7, 73, 74.2, 74.4, 74.3; 24/16 R
See application file for complete search history.

(56) References Cited

U.S. PATENT DOCUMENTS

| | | | | |
|---|---|---|---|---|
| 2,338,006 A | * | 12/1943 | Morehouse | 248/74.3 |
| 2,899,160 A | | 8/1959 | Sher et al. | |
| 3,061,253 A | * | 10/1962 | Keaton | 248/74.1 |
| 3,376,004 A | * | 4/1968 | Goldman | 248/74.3 |
| 3,460,788 A | * | 8/1969 | Goldman | 248/74.3 |
| 5,323,517 A | | 6/1994 | Su | |
| 5,865,476 A | * | 2/1999 | Kramer | 285/242 |
| 6,398,170 B1 | * | 6/2002 | Wada | 248/74.5 |
| 7,392,569 B2 | | 7/2008 | Sharkey et al. | |
| 2005/0188509 A1 | | 9/2005 | Sharkey | |
| 2006/0213039 A1 | | 9/2006 | Sampson | |

* cited by examiner

*Primary Examiner* — Anita M King
(74) *Attorney, Agent, or Firm* — Baker & Hostetler LLP (57) ABSTRACT

A side-locking clamp that includes a lower band and an upper band is provided. The lower band includes an arcuate body with a hinge portion disposed at a proximal end, and an extension with a mounting hole and a locking tab disposed at a distal end. The upper band includes an arcuate body with a hinge portion, disposed at a proximal end, to engage the lower band hinge portion and form a hinge about which the upper band rotates from an open position to a closed position, and an extension with a mounting hole and a locking tab, disposed at a distal end, to slidingly engage the lower band locking tab and lock the clamp when the upper band is disposed in the closed position.

19 Claims, 8 Drawing Sheets

SIDE-LOCKING CLAMPING APPARATUS AND METHOD

CROSS-REFERENCE TO RELATED APPLICATIONS

This application claims the benefit of U.S. Provisional Patent Application No. 61/176,236, filed on May 7, 2009, the disclosure of which is incorporated herein by reference in its entirety.

FIELD OF THE INVENTION

The present invention relates generally to retaining mechanisms. More particularly, the present invention relates to a side-locking clamping apparatus and method.

BACKGROUND OF THE INVENTION

There are many clamping devices that exist for retaining wires and the like for many different applications. They include cushioned and uncushioned loop clamps, hose clamps and snapper type clamps, among others. The loop clamp is common in the aircraft and automotive industries, for both original equipment manufacturing as well as aftermarket sectors. These clamps are often used to attach pods and splitters to the airframe. The cushioned clamps are sometimes used to dampen vibration.

There are many disadvantages to the typical loop clamp. The clamps are difficult to install and therefore require more time and effort. The typical loop clamp is ergonomically undesirable in that repeated installation of the clamp results in carpal tunnel injuries for the operators. Also, many loop clamps are heavy and cannot be rotated or stacked when installed.

Most clamps require screws or bolts to keep the clamp locked. Others have two separate pieces that need to be locked at both ends with screws or bolts. Snapper type clamps require pliers for the installation. Thus, these all require tools for installation.

These clamps have a limited life in that repeated use may not be possible. The frequent removal and installation may cause fatigue on the clamp band and may lead to complete failure of the clamp. This is very undesirable especially in aircraft applications. In addition, such failures result in increased cost.

The ability to reuse clamps is desired for many reasons. However, traditional clamps may not be reused on engines, such as aircraft turbojets, because of the immense heat cycling and vibration. The metal fatigues and the cushion deforms. Other areas where traditional clamps may not be reused include pressure lines of hydraulic systems, aircraft engine pylons and wings.

Installing and removing wires, ducts and the like from traditional clamps can be cumbersome. Traditional loop clamp openings are not very wide and require a considerable amount of effort to be opened. Once opened, conventional loop clamps undergo metal fatigue and are subject to additional fatigue or failure when closed. In addition, the cushions that often are used with these clamps slip off or do not provide the amount of cushioning required, leading to greater abrasion and vibration.

Accordingly, it is desirable to provide an improved apparatus and method for a clamping assembly that is easier to install, ergonomically favorable, lockable, stackable, rotatable and lightweight. Moreover, it is desirable that the clamp be reused numerous times, in any type of application, without the likelihood of fatigue or failure, which also reduces cost.

SUMMARY OF THE INVENTION

Embodiments of the present invention advantageously provide a side-locking clamping apparatus and method.

In one embodiment, a side-locking clamp that includes a lower band and an upper band is provided. The lower band includes an arcuate body with a hinge portion disposed at a proximal end, and an extension with a mounting hole and a locking tab disposed at a distal end. The upper band includes an arcuate body with a hinge portion, disposed at a proximal end, to engage the lower band hinge portion and form a hinge about which the upper band rotates from an open position to a closed position, and an extension with a mounting hole and a locking tab, disposed at a distal end, to slidingly engage the lower band locking tab and lock the clamp when the upper band is disposed in the closed position.

In another embodiment, a method for mounting an object to a support using a side-locking clamp that includes a lower band, with a mounting hole and a locking tab, that is rotatably coupled to an upper band with a mounting hole and a cooperating locking tab, is provided. The method includes disposing the side-locking clamp in an open position such that the upper band and the lower band substantially surround the object, rotating the upper band toward the lower band, as the upper band approaches the lower band, translating the upper band laterally, in an unlocking direction, so that the upper band locking tab clears the lower band locking tab, translating the upper band laterally, in a locking direction, so that the upper band locking tab slidingly engages the lower band locking tab, and mounting the side-locking clamp to a support.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout.

Embodiments of the present invention provide a side-locking clamping apparatus and method. The side-locking feature advantageously requires less force than known clamps, for example, since one is not working against the clamp cushion thickness and/or clamp stiffness. Advantageously, multiple thickness combinations are not necessarily required, which results in weight savings. Generally, FIGS. 1 to 16 provide several views of a side-locking clamp, in accordance with various embodiments of the present invention.

Figure 1:
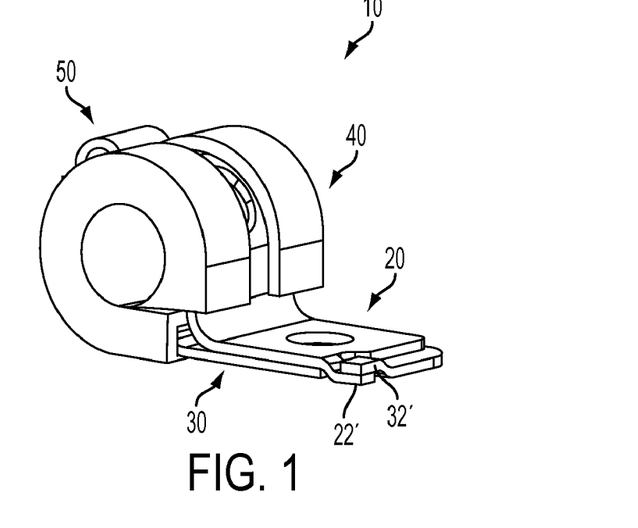
FIG. 1 presents a perspective view of a slide-locking clamp in a closed and locked position, in accordance with one embodiment of the present invention.
Figure 2:
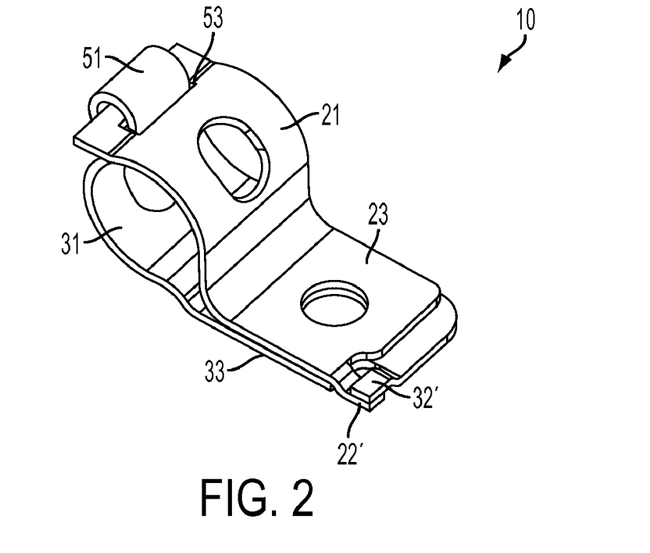
FIG. 2 presents a perspective view of the slide-locking clamp of FIG. 1, without the cushion.
Figure 3:
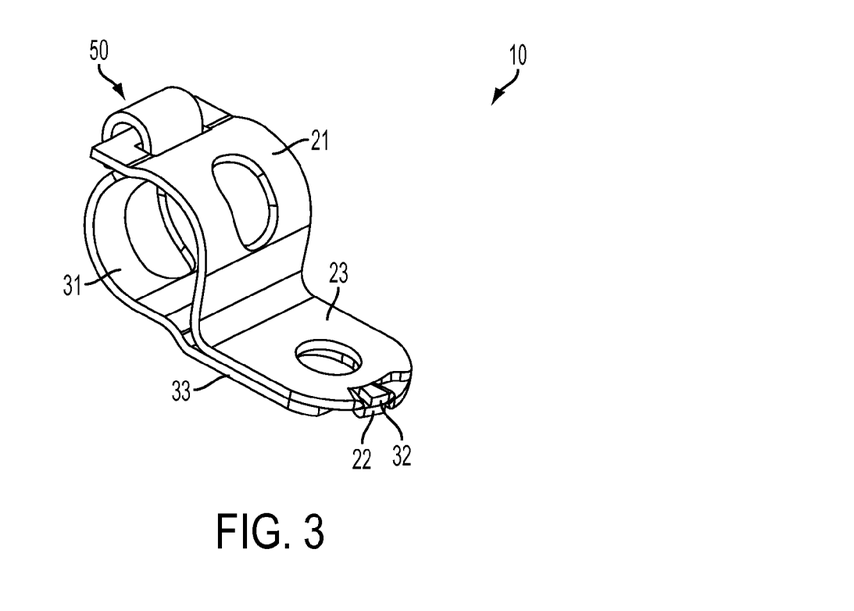
FIG. 3 presents a perspective view of a slide-locking clamp in a closed and locked position and without a cushion, in accordance with another embodiment of the present invention.

FIGS. 1 and 2 present perspective views of a slide-locking clamp in a closed and locked position, in accordance with one embodiment of the present invention. Clamp 10 includes an upper band 20, a lower band 30, and an optional cushion 40, for example, formed from rubber or a similar material. In a preferred embodiment, the upper and lower bands 20, 30 are made from metal; other materials are also contemplated by the present invention.

Upper band 20 includes an arcuate body 21 with a hinge portion, e.g., slot 53, disposed at a proximal end, and an extension 23 with a locking tab 22' disposed at a distal end. Lower band 30 includes a complementary arcuate body 31 with a hinge portion, e.g., arcuate tab 51, disposed at a proximal end, and an extension 33 with a complementary locking tab 32' disposed at a distal end. Locking tabs 22' and 32' are angled, as depicted in FIGS. 1 and 2, to slidingly engage and abut one another when clamp 10 is disposed in a closed and locked position (as shown). Hinge 50, formed from respective portions of the upper and lower bands 20, 30, e.g., arcuate tab 51 and slot 53, rotatably couples upper band 20 to lower band 30. When clamp 10 is closed and locked, arcuate body 21 and arcuate body 31 define a cylindrical cavity in which wires, cables, tubing, etc., may be captured.

Figure 4:
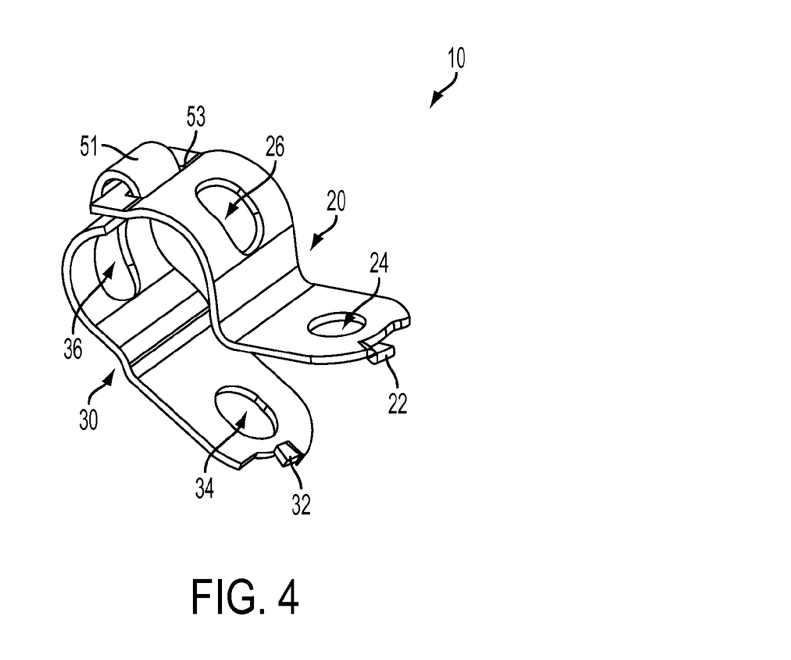
FIG. 4 presents a perspective view of the slide-locking clamp of FIG. 3 in an open and unlocked position.
Figure 5:
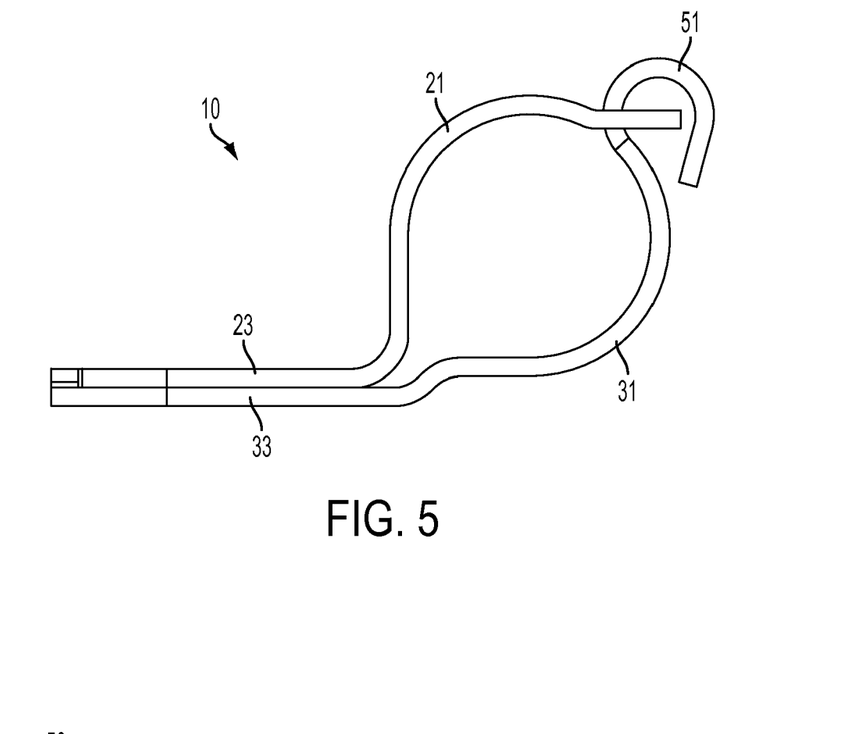
FIG. 5 presents a left-side view of the slide-locking clamp of FIG. 3.
Figure 6:
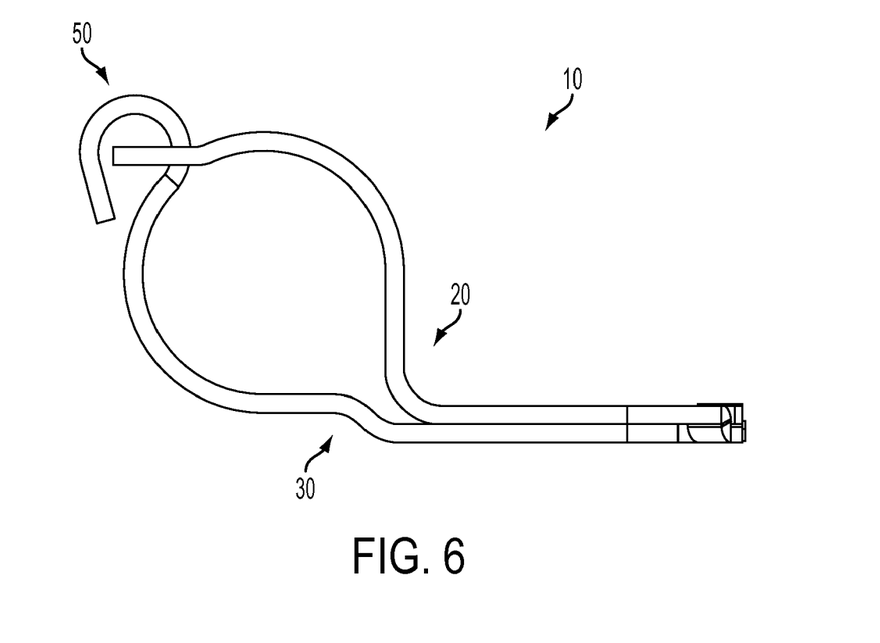
FIG. 6 presents a right-side view of the slide-locking clamp of FIG. 3.
Figure 7:
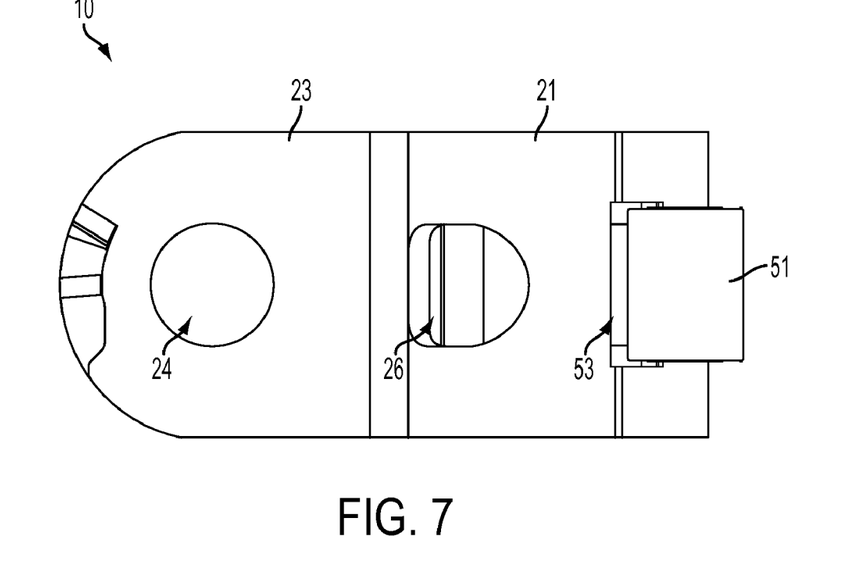
FIG. 7 presents a top view of the slide-locking clamp of FIG. 3.
Figure 8:
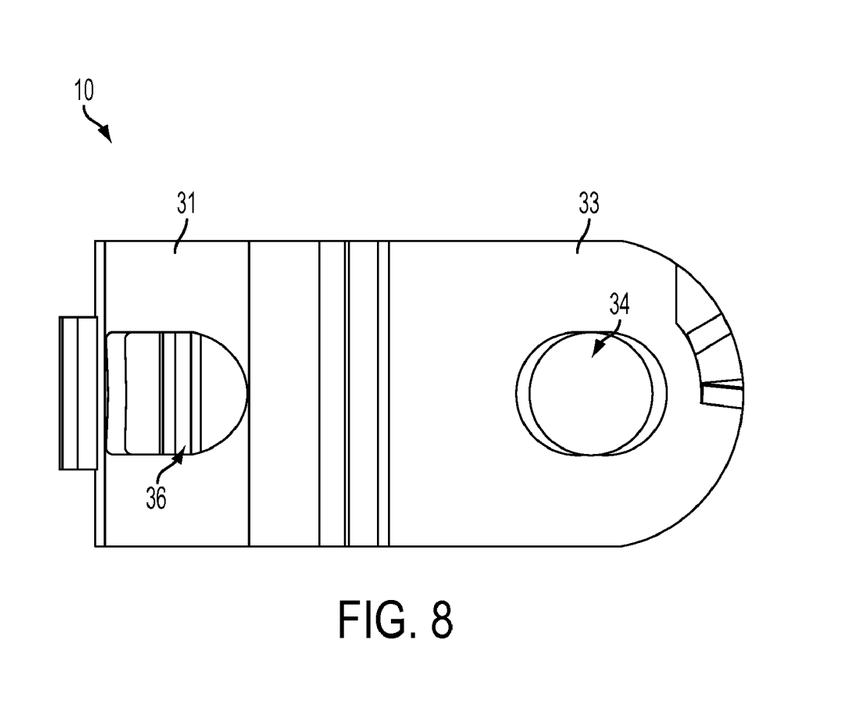
FIG. 8 presents a bottom view of the slide-locking clamp of FIG. 3.
Figure 9:
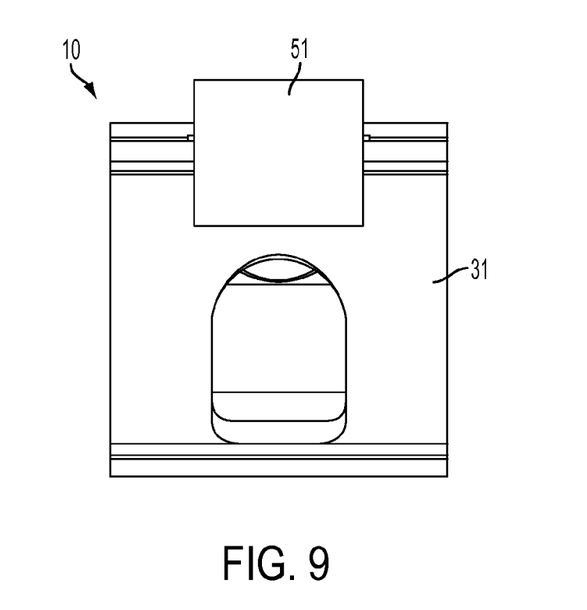
FIG. 9 presents a rear view of the slide-locking clamp of FIG. 3.
Figure 10:
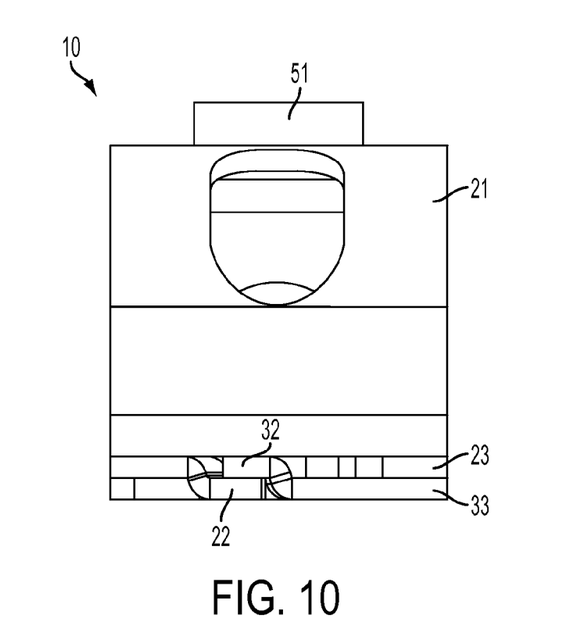
FIG. 10 presents a front view of the slide-locking clamp of FIG. 3.
Figure 11:
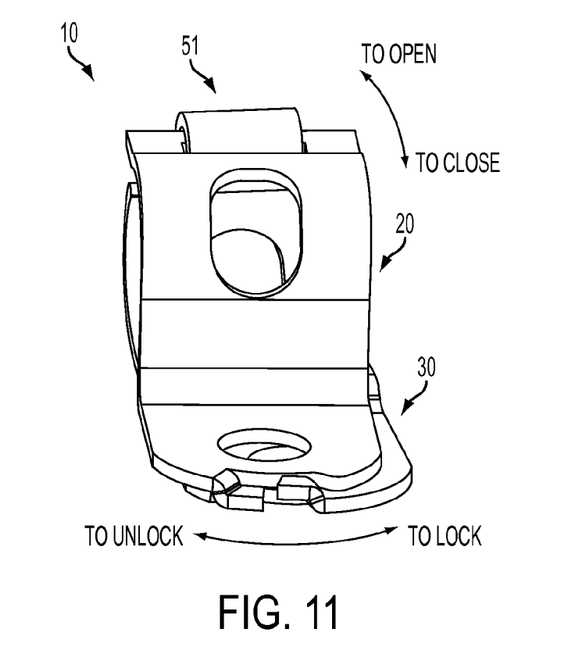
FIG. 11 presents a perspective view of the slide-locking clamp of FIG. 3 in a closed an unlocked position.
Figure 12:
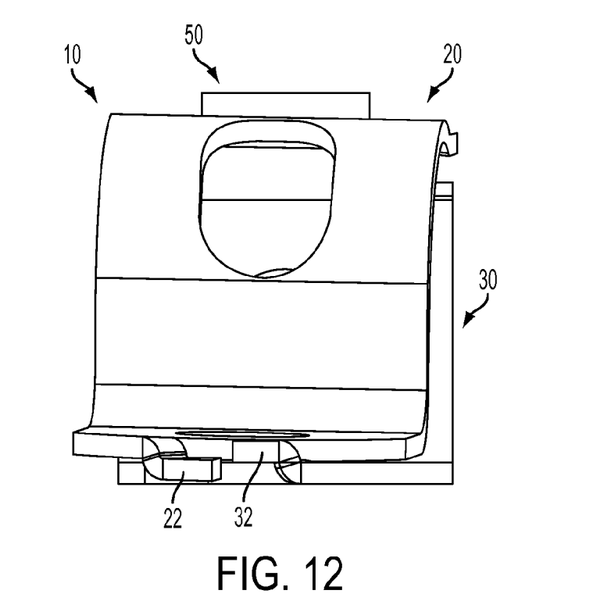
FIG. 12 presents a front view of the slide-locking clamp of FIG. 3 in a closed and unlocked position.

FIGS. 3 to 12 present various views of a slide-locking clamp, with optional cushion 40 removed for clarity, in accordance with another embodiment of the present invention. FIGS. 3 and 5 to 10 depict this embodiment in a closed and locked position, FIG. 4 depicts this embodiment in an open and unlocked position, while FIGS. 11 and 12 depict this embodiment in a closed and unlocked position.

Similar to the clamp depicted in FIGS. 1 and 2, clamp 10 includes an upper band 20, a lower band 30, and a cushion 40, formed, for example, from rubber or a similar material. In a preferred embodiment, the upper and lower bands 20, 30 are made from metal; other materials are also contemplated by the present invention. Upper band 20 includes an arcuate body 21 with a hinge portion, e.g., slot 53, disposed at a proximal end, and an extension 23 with a locking tab 22 disposed at a distal end. Lower band 30 includes a complementary arcuate body 31 with a hinge portion, e.g., arcuate tab 51, disposed at a proximal end, and an extension 33 with a complementary locking tab 32 disposed at a distal end. Locking tabs 22 and 32 are angled to slidingly engage and abut one another when clamp 10 is disposed in a closed and locked position (as shown in FIGS. 3 and 5 to 10). Hinge 50, formed from respective portions of the upper and lower bands 20, 30, e.g., arcuate tab 51 and slot 53, rotatably couples upper band 20 to lower band 30. When clamp 10 is closed and locked, arcuate body 21 and arcuate body 31 define a cylindrical cavity in which wires, cables, etc., may be captured.

Mounting holes 24, 34 are provided in the upper and lower bands 20, 30, respectively, and, in one embodiment, lightening holes 26, 36 may be provided in the upper and lower bands 20, 30, respectively. Mounting holes 24, 34 may be the same shape, e.g., circular, oval, etc., or different shapes, e.g., a circular upper hole 24 and an oval lower hole 34. The lightening holes 26, 36 may also provide ease of fastener installation when there is a misalignment of the upper and lower bands 20, 30.

FIGS. 11 and 12 depict the relative movement between the upper and lower bands 20, 30 during operation. To lock clamp 10, the upper band 20 is rotated downward toward the lower band 30, i.e., from an open position to a closed position, and translated slightly in the unlocking direction so that locking tab 22 clears locking tab 32. The upper band 20 is then translated in the locking direction so that locking tabs 22, 32 are engaged. This process may be assisted by an optional cushion 40 (not shown for clarity), since cushion 40 tends to re-align the upper and lower bands 20, 30. Once the locking tabs 22, 32 are engaged, the clamp 10 is maintained in place by the clamp's payload, for example, such as wires, cables, tubing, etc., as well as the optional cushion 40. The upper and lower bands 20, 30 rotate with respect to one another via the hinge 50. The reverse process is followed to unlock the clamp 10. In this embodiment, the unlocking direction is clockwise with respect to hinge 50.

In use, clamp 10 is first disposed in the open position such that upper band 20 and lower band 30 substantially surround the object to be clamped. Upper band 20 is then rotated toward lower band 30, and, as upper band 20 approaches lower band 30, upper band 20 is translated laterally, in the unlocking direction, so that upper band locking tab 22 clears lower band locking tab 32. Upper band 20 is then translated laterally, in the locking direction, such that upper band locking tab 22 slidingly engages lower band locking tab 32.

Clamp 10 is then mounted to a support (not shown) using a bolt, screw, etc., inserted through mounting holes 24, 34.

Due to the design of the upper and lower locking tabs 22, 32, in a preferred embodiment, the upper band 20 has the same thickness as the lower band 30, which provides enhanced clamp stackability, i.e., multiple clamps 10 may be vertically stacked and aligned via mounting holes 24, 34. In one embodiment, one or more groups of four clamps 10 may be arranged in a clover-leaf fashion. The elongated, oblong hole 34 also provides an easy fit for the mounting hardware, e.g., screw, bolt, etc., thus reducing installation time and allowing for one-hand operation. Many of these inventive features advantageously combine to reduce the weight of the clamp 10.

Figure 13:
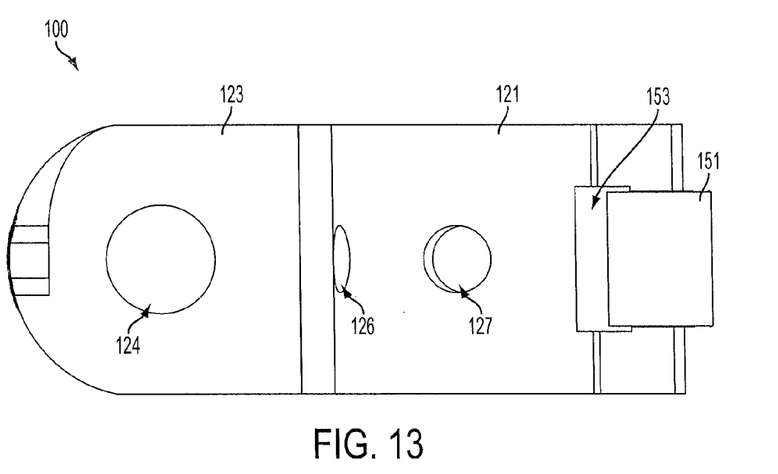
FIG. 13 presents a top view of a slide-locking clamp in a closed and locked position without a cushion, in accordance with a further embodiment of the present invention.
Figure 14:
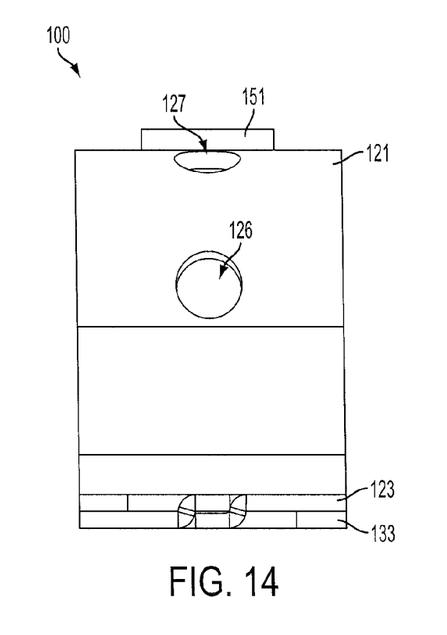
FIG. 14 presents a front view of the slide-locking clamp of FIG. 13.
Figure 15:
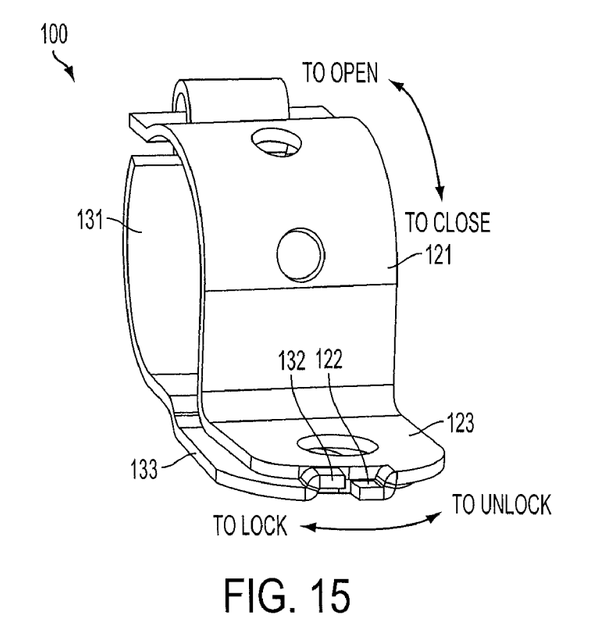
FIG. 15 presents a perspective view of the slide-locking clamp of FIG. 13 in a closed and unlocked position.
Figure 16:
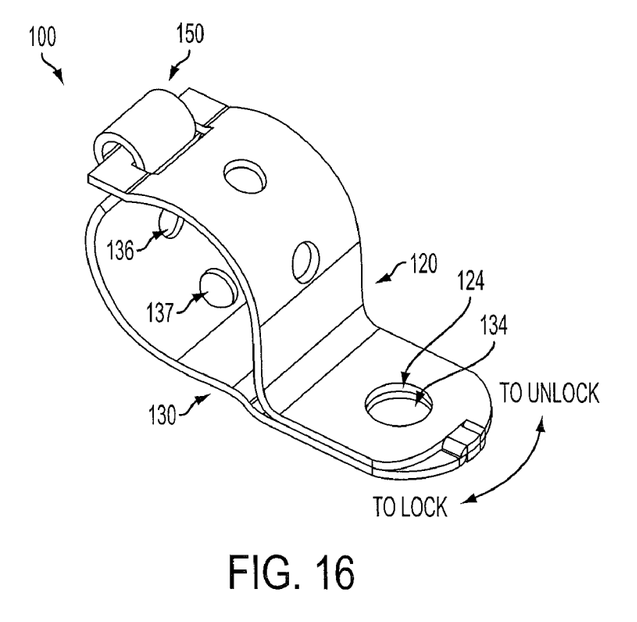
FIG. 16 presents a perspective view of the slide-locking clamp of FIG. 13 in a closed and locked position.

FIGS. 13 to 16 present various views of a slide-locking clamp, with optional cushion 40 removed for clarity, in accordance with a further embodiment of the present invention. FIGS. 13, 14 and 16 depict this embodiment in a closed and locked position, while FIG. 15 depicts this embodiment in a closed and unlocked position.

Similar to the clamp depicted in FIGS. 3 to 12, clamp 100 includes an upper band 120, a lower band 130, and an optional cushion 40 (not shown for clarity), formed, for example, from rubber or a similar material. In a preferred embodiment, the lower and upper bands 120, 130 are made from metal; other materials are also contemplated by the present invention. Upper band 120 includes an arcuate body 121 with a hinge portion, e.g., slot 153, disposed at a proximal end, and an extension 123 with a locking tab 122 disposed at a distal end. Lower band 130 includes a complementary arcuate body 131 with a hinge portion, e.g., arcuate tab 151, disposed at a proximal end, and an extension 133 with a complementary locking tab 132 disposed at a distal end. Locking tabs 122 and 132 are angled to slidingly engage and abut one another when clamp 100 is disposed in a closed and locked position (as shown in FIGS. 3 and 5 to 10). Hinge 150, formed from respective portions of the upper and lower bands 120, 130, e.g., arcuate tab 151 and slot 153, rotatably couples upper band 120 to lower band 130. When clamp 100 is closed and locked, arcuate body 121 and arcuate body 131 define a cylindrical cavity in which wires, cables, etc., may be captured.

Mounting holes 124, 134 are provided in the upper and lower bands 120, 130, respectively, and, in one embodiment, lightening holes 126, 136 may be provided in the upper and lower bands 120, 130, respectively. Mounting holes 124, 134 may be the same shape, e.g., circular, oval, etc., or different shapes, e.g., a circular upper hole 124 and an oval lower hole 134. The lightening holes 126, 127, 136, 137 may also provide ease of fastener installation when there is a misalignment of the upper and lower bands 120, 130.

FIGS. 15 and 16 depict the relative movement between the upper and lower bands 120, 130 during operation. To lock clamp 100, the upper band 120 is rotated downward toward the lower band 130, i.e., from an open position to a closed position, and laterally translated in the unlocking direction so that locking tab 122 clears locking tab 132. The upper band 120 is then laterally translated in the locking direction so that locking tabs 122, 132 are engaged. This process may be assisted by an optional cushion 40 (not shown for clarity), since cushion 40 tends to re-align the upper and lower bands 120, 130. Once the locking tabs 122, 132 are engaged, the clamp 100 is maintained in place by the clamp's payload, for example, such as wires, cables, tubing, etc., as well as the optional cushion 40. The upper and lower bands 120, 130 rotate with respect to one another via the hinge 150. The reverse process is followed to unlock the clamp 100. In this embodiment, the unlocking direction is counter-clockwise with respect to hinge 150.

In use, clamp 100 is first disposed in the open position such that upper band 120 and lower band 130 substantially surround the object to be clamped. Upper band 120 is then rotated toward lower band 130, and, as upper band 120 approaches lower band 130, upper band 120 is translated laterally, in the unlocking direction, so that upper band locking tab 122 clears lower band locking tab 132. Upper band 120 is then translated laterally, in the locking direction, such that upper band locking tab 122 slidingly engages lower band locking tab 132. Clamp 100 is then mounted to a support (not shown) using a bolt, screw, etc., inserted through mounting holes 124, 134.

Due to the design of the locking tabs 122, 132, in a preferred embodiment, the upper band 120 has the same thickness as the lower band 130, which provides enhanced clamp stackability, i.e., multiple clamps 100 may be vertically stacked and aligned via mounting holes 124, 134. In one embodiment, one or more groups of four clamps 100 may be arranged in a clover-leaf fashion. The elongated, oblong hole 134 also provides an easy fit for the mounting hardware, e.g., screw, bolt, etc., thus reducing installation time and allowing for one-hand operation. Many of these inventive features advantageously combine to reduce the weight of the clamp 10.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A side-locking clamp, comprising:
    a lower band, including:
        an arcuate body with a hinge portion disposed at a proximal end, and
        an extension with a mounting hole and a curved locking tab disposed on a curved distal end; and
    an upper band, including:
        an arcuate body with a hinge portion, disposed at a proximal end, to engage the lower band hinge portion and form a hinge about which the upper band rotates from an open position to a closed position, and
        an extension, with a mounting hole and a curved locking tab disposed on a curved distal edge, to slidingly engage the lower band locking tab from right to left when viewed from the front and lock the clamp when the upper band is disposed in the closed position.

2. The clamp according to claim 1, wherein, when the upper band is disposed in the closed position, the inner surface of the lower band arcuate body and the inner surface of the upper band arcuate body define a cylindrical cavity.

3. The clamp according to claim 1, wherein the lower band hinge portion is an arcuate tab and the upper band hinge portion is a slot in which the arcuate tab is cooperatively disposed.

4. The clamp according to claim 1, wherein the upper band arcuate body includes at least one lightening hole.

5. The clamp according to claim 1, wherein the lower band arcuate body includes at least one lightening hole.

6. The clamp according to claim 1, wherein the lower band locking tab thickness is substantially the same as the upper band extension thickness, and the upper band locking tab thickness is substantially the same as the lower band extension thickness.

7. The clamp according to claim 1, wherein, when the upper band is disposed in the closed position, the lower band mounting hole and the upper band mounting hole substantially overlay one another.

8. The clamp according to claim 1, further comprising a cushion substantially surrounding the lower band arcuate body and the upper band arcuate body.

9. A method for mounting an object to a support using the side-locking clamp according to claim 1, the method comprising:
- disposing the side-locking clamp in an open position such that the upper band and the lower band substantially surround the object;
- rotating the upper band toward the lower band;
- as the upper band approaches the lower band, translating the upper band laterally, in an unlocking direction, so that the upper band locking tab clears the lower band locking tab;
- translating the upper band laterally, in a locking direction, so that the upper band locking tab slidingly engages the lower band locking tab; and
- mounting the side-locking clamp to a support.

10. A side-locking clamp, comprising:
a lower band, including:
- an arcuate body with a hinge portion disposed at a proximal end, and
- an extension with a mounting hole and a curved locking tab disposed on a curved distal end; and an upper band, including:
- an arcuate body with a hinge portion, disposed at a proximal end, to engage the lower band hinge portion and form a hinge about which the upper band rotates from an open position to a closed position, and
- an extension, with a mounting hole and a curved locking tab disposed on a curved distal edge, to slidingly engage the lower band locking tab from left to right when viewed from the front.

11. The clamp according to claim 10, wherein, when the upper band is disposed in the closed position, the inner surface of the lower band arcuate body and the inner surface of the upper band arcuate body define a cylindrical cavity.

12. The clamp according to claim 10, wherein the lower band hinge portion is an arcuate tab and the upper band hinge portion is a slot in which the arcuate tab is cooperatively disposed.

13. The clamp according to claim 10, wherein the upper band arcuate body includes at least one lightening hole.

14. The clamp according to claim 10, wherein the lower band arcuate body includes at least one lightening hole.

15. The clamp according to claim 10, wherein the lower band locking tab thickness is substantially the same as the upper band extension thickness, and the upper band locking tab thickness is substantially the same as the lower band extension thickness.

16. The clamp according to claim 10, wherein, when the upper band is disposed in the closed position, the lower band mounting hole and the upper band mounting hole substantially overlay one another.

17. The clamp according to claim 10, wherein the upper band locking tab slidingly engages the lower band locking tab from left to right when viewed from the front.

18. The clamp according to claim 10, further comprising a cushion substantially surrounding the lower band arcuate body and the upper band arcuate body.

19. A method for mounting an object to a support using the side-locking clamp according to claim 10, the method comprising:
- disposing the side-locking clamp in an open position such that the upper band and the lower band substantially surround the object;
- rotating the upper band toward the lower band;
- as the upper band approaches the lower band, translating the upper band laterally, in an unlocking direction, so that the upper band locking tab clears the lower band locking tab;
- translating the upper band laterally, in a locking direction, so that the upper band locking tab slidingly engages the lower band locking tab; and
- mounting the side-locking clamp to a support.

* * * * *